United States Patent
Vidhi et al.

(10) Patent No.: US 10,661,678 B2
(45) Date of Patent: May 26, 2020

(54) CURTAILING BATTERY DEGRADATION OF AN ELECTRIC VEHICLE DURING LONG-TERM PARKING

(71) Applicant: INVENTUS HOLDINGS, LLC, Juno Beach, FL (US)

(72) Inventors: Rachana Vidhi, Palm Beach Gardens, FL (US); Daniel M Brake, Hobe Sound, FL (US); Prasanna Shrivastava, Palm Beach Gardens, FL (US); Christopher S. Collins, North Palm Beach, FL (US)

(73) Assignee: INVENTUS HOLDINGS, LLC, Juno Beach, FL (US)

( * ) Notice: Subject to any disclaimer, the term of this patent is extended or adjusted under 35 U.S.C. 154(b) by 0 days.

(21) Appl. No.: 16/142,549

(22) Filed: Sep. 26, 2018

(65) Prior Publication Data

US 2020/0094691 A1    Mar. 26, 2020

(51) Int. Cl.
| | |
|---|---|
| *B60L 58/13* | (2019.01) |
| *B60K 6/20* | (2007.10) |
| *G06Q 50/06* | (2012.01) |
| *G06Q 20/14* | (2012.01) |
| *B60L 55/00* | (2019.01) |
| *B60L 53/66* | (2019.01) |

(52) U.S. Cl.
CPC .......... *B60L 58/13* (2019.02); *B60K 6/20* (2013.01); *B60L 53/665* (2019.02); *B60L 55/00* (2019.02); *G06Q 20/14* (2013.01); *G06Q 50/06* (2013.01); *B60L 2230/16* (2013.01); *B60Y 2200/91* (2013.01); *B60Y 2200/92* (2013.01); *B60Y 2300/91* (2013.01)

(58) Field of Classification Search
CPC ..................................................... B60L 58/13
USPC ........................................................ 320/128
See application file for complete search history.

(56) References Cited

U.S. PATENT DOCUMENTS

| | | | |
|---|---|---|---|
| 9,457,680 B2 | 10/2016 | Shinzaki et al. | |
| 2004/0062059 A1 | 4/2004 | Cheng et al. | |
| 2009/0030712 A1 | 1/2009 | Bogolea et al. | |
| 2009/0066287 A1 | 3/2009 | Pollack et al. | |
| 2013/0179061 A1 | 7/2013 | Gadh et al. | |
| 2015/0268304 A1* | 9/2015 | Yonetani ................. | H02J 7/007 320/134 |

(Continued)

*Primary Examiner* — Suresh Memula
(74) *Attorney, Agent, or Firm* — Tarolli, Sundheim, Covell & Tummino LLP

(57) ABSTRACT

A non-transitory machine readable medium having machine executable instructions can include a charge control application. The charge control application can determine, in response to detecting that an electric vehicle (EV) is electrically coupled to a vehicle-to-grid (V2G) interface, a degradation threshold state of charge (SoC) for a battery of the EV. The charge control application can also command the V2G interface to discharge the battery of the EV to a lower threshold SoC that is below the degradation threshold SoC. The charge control application can further command the V2G interface to charge the battery of the EV to an upper threshold SoC that is above the degradation threshold SoC at a return threshold time, wherein the return threshold time is a calculated amount of time prior to an expected return time of an operator of the EV.

20 Claims, 7 Drawing Sheets

(56) References Cited

U.S. PATENT DOCUMENTS

| | | | |
|---|---|---|---|
| 2016/0137073 A1* | 5/2016 | Krammer | B60L 53/12 |
| | | | 320/108 |
| 2017/0264135 A1* | 9/2017 | Hashimoto | G06Q 50/06 |
| 2018/0170207 A1* | 6/2018 | Ko | H02J 7/0091 |
| 2018/0186246 A1 | 7/2018 | Kudo et al. | |
| 2018/0218459 A1* | 8/2018 | Yokoyama | G06Q 50/06 |
| 2018/0222337 A1* | 8/2018 | Cook | B60L 53/16 |
| 2019/0039465 A1* | 2/2019 | Jang | H02J 7/00 |
| 2019/0184850 A1* | 6/2019 | Lee | B60L 53/67 |

* cited by examiner

CURTAILING BATTERY DEGRADATION OF AN ELECTRIC VEHICLE DURING LONG-TERM PARKING

TECHNICAL FIELD

This disclosure relates to electric vehicles (EV), more particularly, this disclosure relates to curtailing battery degradation of EVs.

BACKGROUND

An electric vehicle, also called an EV, uses one or more electric motors or traction motors for propulsion. An EV may be powered through a collector system by electricity from off-vehicle sources, or may be self-contained with a battery, solar panels or an electric generator to convert fuel to electricity. EVs include, but are not limited to, road and rail vehicles, surface and underwater vessels, electric aircraft and electric spacecraft. An electric-vehicle battery (EVB) or traction battery is a battery used to power the propulsion of EVs. Vehicle batteries are usually a secondary (rechargeable) battery. Traction batteries are used in forklifts, electric golf carts, riding floor scrubbers, electric motorcycles, electric cars, trucks, vans, and other electric vehicles. A plug-in electric vehicle (PEV) is a motor vehicle that can be recharged from any external source of electricity, such as wall sockets, and the electricity stored in the rechargeable battery packs drives or contributes to drive the wheels. PEV is a subcategory of EVs that includes all-electric or battery electric vehicles (BEVs), plug-in hybrid vehicles, (PHEVs), and electric vehicle conversions of hybrid electric vehicles and conventional internal combustion engine vehicles.

An EV charging station, also called an electric recharging point, charging point, charge point, ECS (Electronic Charging Station) and EVSE (electric vehicle supply equipment), is an element in an infrastructure that supplies electric power for the recharging of electric vehicles, such as plug-in electric vehicles, including electric cars, neighborhood electric vehicles and plug-in hybrids. At home or work, some EVs have onboard converters that can plug into a standard electrical outlet or a high-capacity appliance outlet. EVs use a charging station that provides electrical conversion, monitoring, or safety functionality. These charging stations are also needed when traveling, and many support faster charging at higher voltages and currents than are available from residential EVSEs. Some public charging stations are implemented as on-street facilities provided by electric utility companies or located at retail shopping centers and operated by many private companies.

Vehicle-to-grid (V2G) describes a system in which PEVs such as battery electric vehicles (BEV), plug-in hybrids (PHEV) or hydrogen fuel cell electric vehicles (FCEV), communicate with a power grid to sell demand response and/or other services by supplying electricity to the power grid.

SUMMARY

One example relates to a non-transitory machine readable medium having machine executable instructions including a charge control application. The charge control application can determine, in response to detecting that an electric vehicle (EV) is electrically coupled to a vehicle-to-grid (V2G) interface, a degradation threshold state of charge (SoC) for a battery of the EV. The charge control application can also command the V2G interface to discharge the battery of the EV to a lower threshold SoC that is below the degradation threshold SoC. The charge control application can further command the V2G interface to charge the battery of the EV to an upper threshold SoC that is above the degradation threshold SoC at a return threshold time, wherein the return threshold time is a calculated amount of time prior to an expected return time of an operator of the EV.

Another example relates to a system for curtailing degradation of a battery of an electric vehicle EV. The system can include a V2G interface located at a parking spot of a parking area, the V2G interface can include a receptacle for charging and discharging an EV. The system can also include a charging server in communication with the V2G interface that determines, in response to a request from the V2G interface, a degradation threshold SoC for a battery of the EV connected to the receptacle of the V2G interface, wherein the degradation threshold SoC is based on physical properties of a battery of the EV. The charging server can also command the V2G interface to discharge the battery of the EV to a lower threshold SoC that is below the degradation threshold SoC. The charging server can further command the V2G interface to charge the battery of the EV to an upper threshold SoC that is above the degradation threshold SoC at an return time threshold that corresponds to a calculated amount of time prior to an expected return time of an operator of the EV.

Yet another example relates to a method for curtailing degradation of a battery of an EV. The method can include determining, in response to detecting that an electric vehicle EV is electrically coupled to a V2G interface, an expected return time of an operator of the EV. The method can also include discharging a battery of the EV to a level below a degradation threshold SoC for the battery of the EV. The method can further include initiating a charging of the battery of the EV to a level that is above the degradation threshold SoC at a return threshold time that is a calculated amount of time prior to the expected return time of the operator of the EV.

DETAILED DESCRIPTION

Figure 1:
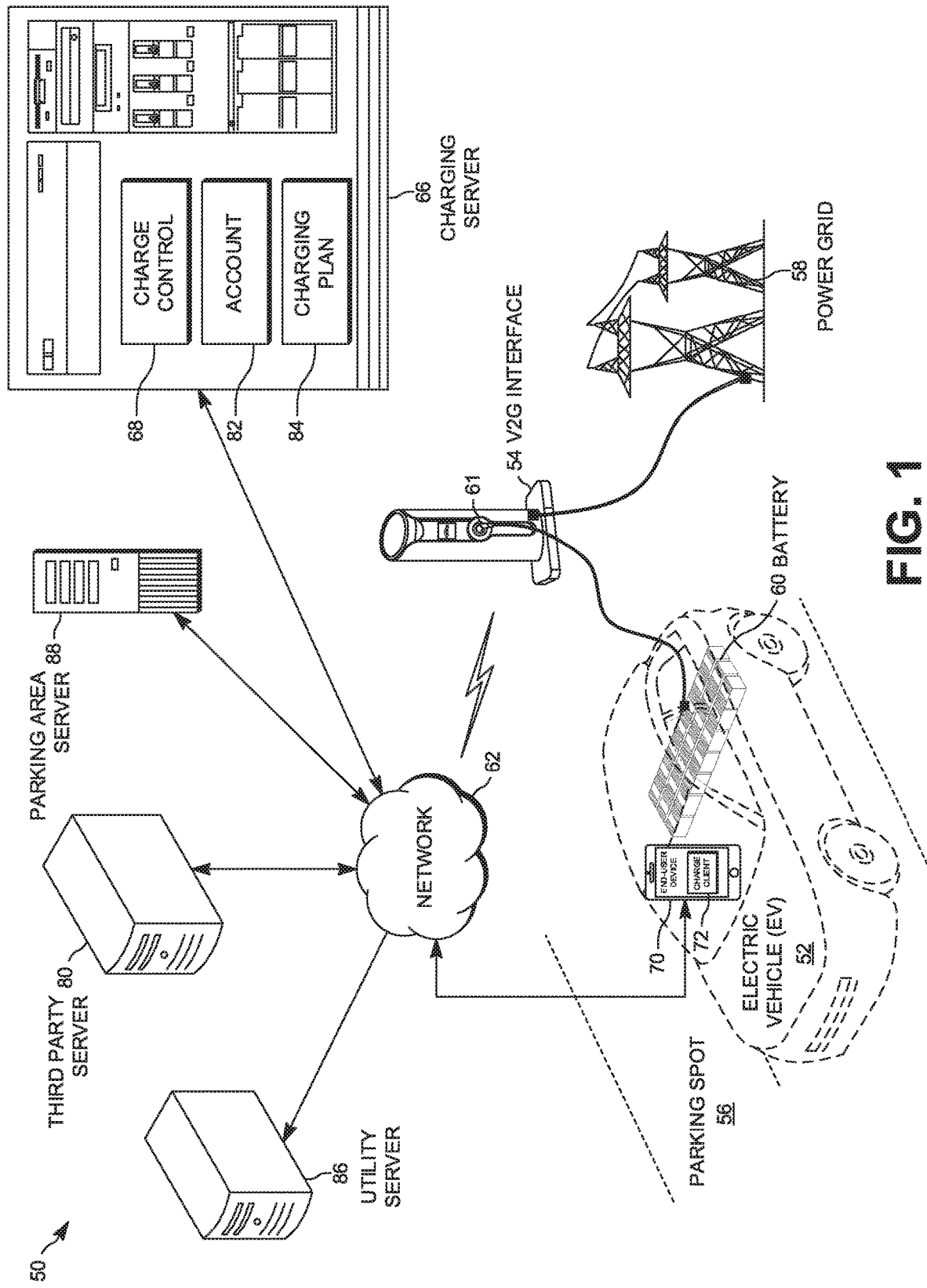
FIG. 1 illustrates an example of a system for curtailing battery degradation of a battery of an electric vehicle (EV).

The present disclosure relates to a (smart) Vehicle-To-Grid (V2G) interface. The V2G interface can operate in concert with a charging server to control bi-directional current flow between a power gird and an electric vehicle (EV). The V2G interface can be implemented at a long-term parking area, such as an airport parking lot or garage, a home parking area (e.g., a home garage or home driveway). In this situation, the V2G interface and the charging server can be configured/programmed to curtail (reduce/limit) battery degradation of the battery in the EV while the EV is parked in the long-term parking area. Some rechargeable batteries for EVs, such as Lithium Ion batteries accelerate battery degradation if the battery is charged beyond a degradation threshold state of charge (SoC). For instance, some batteries experience accelerated battery degradation if the battery is charged above 50% of a total battery capacity (the degradation threshold SoC). Thus, the V2G interface and the charging server co-operate to reduce an overall amount of time that the battery is at or above the degradation threshold SoC.

As one example, an operator (driver) of the EV, upon arriving at a long-term parking spot of the long-term parking area, can supply (via a user interface), an expected return time or information corresponding to the expected return time (which can correspond to a flight number) to the charging server. Additionally, the charging server can collect profile data for the EV that corresponds to an upper threshold SoC and a lower threshold SoC for the EV. The upper threshold SoC can define desired (maximum) state of charge (SoC) of the battery of the EV. That is, the upper threshold SoC can define an expected charge level for the EV upon return of the operator. Additionally, the lower threshold SoC can define a minimum charge for the battery of the SoC.

The charging server can determine the degradation threshold SoC for the battery. Further, the charging server can determine the expected return charge time which defines a time prior to the expected return time that is needed to charge the battery of the EV to the upper threshold SoC. Additionally, based on the profile data, the expected return time and the degradation threshold SoC, the charging server can generate a charging plan for the EV. The charging plan can have three (3) stages, namely an initial stage, a maintenance stage and a return stage. In the initial stage of the charging plan, the charging server commands the V2G interface to discharge the battery of the EV to the lower threshold SoC (below the degradation threshold SoC) to avoid accelerating degradation of the battery.

In the maintenance stage of the charging plan, the charging server commands the V2G interface to repeatedly charge and discharge the battery of the EV. Power discharged from the battery can be supplied to the power grid. In this manner, credits (monetary or non-monetary rewards, as discussed herein) for supplying power to the power grid can be accumulated in an account associated with the operator of EV. These credits can be employed to offset tariffs (fees) for parking the EV in the long-term parking area.

Further, at the expected return charge time, the charging server commands the V2G interface to charge the battery to the upper threshold SoC (which can be above the degradation threshold SoC). In this manner, in addition to accruing credits for providing power to the power grid, the battery life of the vehicle is extended since the time during which the battery of the EV is at or above the degradation threshold SoC is curtailed while still ensuring that the operator returns to the EV with the battery of the EV near the upper threshold SoC. That is, the EV is still charged to the upper threshold SoC upon the operator returning to the EV, but the amount of time that the EV is below the degradation threshold SoC is elevated.

FIG. 1 illustrates an example of a system 50 that can curtailing battery degradation of an electric vehicle (EV) 52.

As used herein, an EV refers to an plug-in electric vehicle (PEV), namely an EV that can be plugged into an electrical receptacle (e.g., an electrical outlet), including a hybrid PEV. The system 50 includes a V2G interface 54 located in a parking spot 56 of a parking area, such as a long-term parking area.

As used herein, the term "long-term parking area" denotes a parking area (e.g., a parking lot or parking garage) where it is expected that vehicles will park overnight or longer. As some examples, long-term parking areas are common near airports, bus stations, train stations and other areas where vehicles (e.g., cars, motorcycles and trucks) are parked prior to boarding a departing airliner, a bus or train. Moreover in such situations, an operator (driver) of such an vehicle returns to the vehicle in long-term parking after arrival of a returning airliner, bus or train. Further, the long-term parking area that includes the parking spot 56 can be implemented as a public parking area or a home parking area (e.g., in a home garage or in a home driveway). Long-term parking areas are often distinguished from short-term parking areas based on an expected amount of time vehicles will be parking in the corresponding parking area. In many short-term parking areas, it is expected that vehicles will be parked and retrieved within a single day.

The V2G interface 54 can be electrically coupled to a power grid 58. The power grid 58 can be representative of an array of electrical equipment, including but not limited to transformers, substations, etc. Moreover, for purposes of simplification of explanation, electrical equipment intervening between the V2G interface 54 and the power grid 58 is hidden for view. Upon parking, an operator of the EV 52 can plug-in (e.g., electrically couple) a battery 60 of the EV 52 to a receptacle 61 of the V2G interface 54. The receptacle 61 can be representative of an electrical socket/outlet.

The V2G interface 54 can be representative of a charging station that provides a V2G system that can charge the battery 60 of the EV 52 with power from the power grid 58 and discharge the battery 60 of the EV 52 and supply the discharged power to the power grid 58. That is, the V2G interface 54 can provide an interface for V2G services. The V2G interface 54 can include a computing device (e.g., a processor and memory or a controller) to control the charging and discharging of the battery 60 of the EV 52.

The V2G interface 54 can communicate with a network 62. The network 62 can be representative of a public network, such as the Internet. Additionally, some portions of the network can be a private network, such as local area network. The V2G interface 54 communicate with a charging server 66. The charging server 66 can represent a computing device that send commands to the V2G interface 54. For purposes of simplification of explanation, unless otherwise noted it is presumed that the V2G interface 54 follows (executes) the commands received from the charging server 66 without further explanation. For instance, if the charging server 66 commands the V2G interface 54 to charge the battery 60 of the EV 52, it is presumed that (in response to the command), the V2G interface 54 charges the battery 60 without further explicit explanation. Moreover, although FIG. 1 illustrates a single V2G interface 54, in other examples, the charging server 66 can communicate with a plurality of V2G interfaces.

The charging server 66 could be implemented in a computing cloud. In such a situation, features of the charging server 66, such as a processing unit, a network interface, and memory could be representative of a single instance of hardware or multiple instances of hardware with applications executing across the multiple of instances (i.e., distributed) of hardware (e.g., computers, routers, memory, processors, or a combination thereof). Alternatively, the charging server 66 could be implemented on a single dedicated server. Furthermore, in some examples, the charging server 66 can be integrated with the V2G interface 54.

The charging server 66 can execute a charge control application 68 (e.g., application software) to communicate with the V2G interface 54 via the network 62. The operator of the EV 52 can employ an end-user device 70 to communicate with the V2G interface 54 and/or the charging server 66. The end-user device 70 can be implemented as a computing device. In some examples, the end-user device 70 can be implemented with a smart phone. In other examples, the end-user device 70 can be an on-board computing device integrated with the EV 52, such as a dashboard computing device.

The charge control application 68 can receive an indication from the V2G interface 54 that the EV 52 has been connected to the V2G interface 54. In response, the charge control application 68 can cause the V2G interface 54 to query the end-user device 70 for profile information and an expected return time.

The end-user device 70 can execute a charge client 72 that can be employed to allow user interaction with the charging server 66 and/or the V2G interface 54. In particular, the charge client 72 can provide a graphical user interface (GUI) that allows entry and/or editing of profile information. As one example, upon electrically coupling the EV 52 to the V2G interface 54, the charge client 72 can provide the operator of the EV 52 to enter information characterizing a make and model of the EV 52, as well as information characterizing features of the battery 60. Such information regarding the battery 60 could be, for example a type (e.g., lithium-ion, nickel metal hydride, nickel-cadmium, lead-acid, etc.) of the battery 60, and/or a capacity (e.g., kilowatt hours (kWh) or ampere hours (Ahr)) of the battery 60. Additionally or alternatively, a portion of the profile information can be stored (e.g., hard coded) into the charge client 72. Furthermore, in some examples, the profile information can include a home address of the operator.

As noted, in some examples, the parking spot 56 can be within a long-term parking area. In such a situation, the charge client 72 can request an expected return time for the operator, and the operator can enter the expected return time. As used herein, the "expected return time" denotes a date and time that the operator is expected to return to the parking spot 56 of the parking area, detach the EV 52 from the V2G interface 54 and drive away. Alternatively, rather than providing the expected return time directly, the charge client 72 can allow the operator to enter information from which the expected return time can be determined. For example, in a situation where the parking area is proximal to an airport, the charge client 72 can allow the operator to provide a flight code for a return flight. In this situation, the flight code of the return flight can be employed to determine the expected return time of the operator in a manner described herein. In a similar manner, in examples where the parking area is proximal to a train station or bus station, the charge client 72 can allow the operator to enter a code identifying a return train or return bus.

The profile information and expected return time (or corresponding information) can be provided to the charge control application 68 (directly or via the V2G interface 54). The charge control application 68 can analyze the profile information and the expected return time or the information corresponding to the expected return time. In examples where the charge client 72 provides information corresponding to the expected return time (e.g., a flight code), the charge control application 68 can query a third party server 80 for detailed information that is employable to derive the expected return time. The third party server 80 could be, for example, a search engine, a database, etc. For example, in the situations where the information corresponding to the expected return time is a flight code, the charge control application 68 can query the third party server for an expected landing time of a flight corresponding to the flight code. In some examples, the charge control application 68 can set the expected return time to the landing time of the flight. In other examples, the charge control application 68 can set the expected return time to the landing time of the flight plus time for baggage claim and travel (e.g., thirty (30) minutes after the expected landing time of the flight).

Additionally, the charging server 66 can query the third party server 80 for information related to the EV 52. As noted, the third party server 80 could be representative of multiple systems. Thus, the third party server 80 could be representative of a search engine or database with information pertaining to the EV 52. Such information can include, for example, information that may be omitted from the profile information, including a type and/or capacity of the battery 60 of the EV 52. Additionally, the V2G interface 54 and/or the EV 52 can measure a state of charge (SoC) of the battery 60. The SoC denotes a percentage of a maximum charge of the battery 60. The measured SoC can be provided to the charge control application 68. The charging server 66 can include an account 82 associated with the operator of the EV 52. The account 82 can accrue tariffs (debits) and credits.

The charge control application 68 can employ the profile information (collected or determined) to determine a degradation threshold SoC for the battery 60 of the EV 52. The degradation threshold SoC is an SoC at which the battery 60 accelerates a reduction of battery life. As used herein, the term "battery life" refers to a measure of battery performance and longevity, which can be quantified in multiple ways, such as a run time on a full charge, as estimated by a manufacturer in milliampere hours (mAhr), or as the number of charge cycles until the end of useful life. That is, keeping the battery 60 at a SoC above the degradation threshold SoC reduces the battery life of the battery 60 faster than if the battery 60 is below the degradation threshold SoC.

The charge control application 68 can calculate and execute a charging plan 84 for the EV 52. The charging plan 84 characterizes time intervals to discharge the battery of the EV 52 and time intervals to charge the battery 60 of the EV 52. In some examples, the charging plan 84 can include stages, such as an initial stage, a maintenance stage and a return stage.

During the initial stage of the charging plan 84, the charging control application 68 commands the V2G interface 54 to discharge the battery 60 of the EV 52 to the lower threshold SoC. The discharged power is supplied to the power grid 58. The lower threshold SoC is set to a level below the degradation threshold SoC. As one example, the lower threshold SoC can be 3% or less. In other examples, the lower threshold SoC can be set to a level sufficient to drive the EV 52 back to the home address of the operator (e.g., 10-20%). In yet other examples, other levels below the degradation threshold SoC can be selected as the lower threshold SoC.

Moreover, during the initial stage the V2G interface 54 measures an amount of power discharged from the battery 60 that is supplied to the power grid 58 and provides data characterizing the supplied power to the charge control application 68. In response, the charge control application can query a utility server 86 for a present (e.g., near real-time) credit value (e.g., per kilowatt hour) for power supplied to the power grid 58. The charge control application 68 can employ the present credit value and the power supplied to the power grid 58 to determine a credit that can be applied to the account 82 of the operator. In some examples, the credit applied can, offset a tariff (debit) for parking in the parking spot 56 of the parking area. For instance, the credits awarded can be monetary rewards, such as cryptocurrency or credits of federally issued currency. Additionally or alternatively, the credits can be implemented as non-monetary rewards, such as but not limited to loyalty points (e.g., in a rewards program), discount coupons, complementary services for the operator of the EV 52, etc.

Upon the battery 60 of the EV 52 being discharged to the lower threshold SoC, in some examples, the charging plan 84 switches to the maintenance stage. In the maintenance stage of the charging plan 84, the charge control application 68 periodically and/or asynchronously commands the V2G interface 40 to (re)charge and (re)discharged the battery 60 of the EV 52 between the lower threshold SoC and a maintenance threshold SoC. The maintenance threshold SoC can be an SoC that is less than the degradation threshold SoC and greater than the lower threshold SoC. That is, the maintenance threshold is between the degradation threshold SoC and the lower threshold SoC. To determine the intervals for charging and discharging in the maintenance stage, the charge control application 68 can periodically or asynchronously query the utility server 86 for a cost of power from the power grid 58 and for the credit value for power provided to the power grid 58.

During the maintenance stage, the charge control application 68 can adjust the charging plan 84 such that the EV 52 is charged at times when the cost for power from the power grid 58 is near a lowest price (e.g., during off-peak times). Similarly, the charge control application 68 can adjust the charging plan 84 such that the EV 56 is discharged at times when the credit for supplying power to the power grid 58 is near a maximum (e.g., during peak times). That is, the charge control application 68 can set the charging plan 84 to a pattern that attempts to elevate revenue (credit) for supplying power to the power grid 58 from the battery 60 of the EV 52 and curtail costs for charging the battery 60 of the EV 52. Moreover, in some examples, the tariffs (debits) for charging the EV 52 during the maintenance stage can be applied to the account 82 of the operator. Additionally or alternatively, the credits for supplying power to the power grid 58 during the maintenance stage can be applied to the account 82 of the operator of the EV 52.

Further, the charging plan 84 can switch to the return stage at a return threshold time. The return threshold time can be a calculated amount of time prior to the expected return time. To calculate the return threshold time, the charge control application 68 calculates an amount of time needed to charge the battery 60 of the EV 52 to an upper threshold SoC. The upper threshold SoC can be an SoC of near 100% or a level specified in the profile information (e.g., 95%). The upper threshold SoC can be above the battery degradation threshold SoC. The charge control application 68 can subtract the time needed to charge the battery 60 of the EV 52 from the expected return time to determine the return threshold time.

Upon the charging plan 84 switching to the return stage at the return threshold time, the charge control application 68 commands the V2G interface 54 to charge the EV 52 to the upper threshold SoC, which is greater than the degradation threshold SoC. In this manner, at or near the expected return time for the operator of the EV 52, the SoC of the battery 60 is at an SoC near the upper charge threshold SoC. Moreover, near the return threshold time, the charge control application 68 can query the utility server 86 for the present cost of power from the power grid 58. The cost can be applied to the account 82 of the operator of the EV 52.

Upon the operator returning to EV 52 and disconnecting the EV 52 from the receptacle 61 of the V2G interface 54, the battery of the EV 52 is at or near the upper threshold SoC. In this manner, the operator can employ the EV 52 to leave the parking spot 56, exit the parking area and travel to another destination (e.g., home). In some examples, upon exiting the parking area, the account 82 associated with the operator can be settled. In particular, upon exiting the parking area, a parking area server 88 can assess tariffs for parking in the parking area. Moreover, the parking area server 88 can access the account 82 associated with the operator of the EV 52 to determine what additional credits (monetary reward or non-monetary rewards, as noted) and/or tariffs are to be applied to the EV 52.

By employment of the system 50, undue degradation of the battery 60 of the EV 52 is avoided. In particular, as noted, during the initial mode, the battery 60 is discharged to a lower threshold SoC, which is below the degradation threshold SoC. Moreover, the battery 60 of the EV 52 is not charged to an SoC above the degradation threshold SoC until near the expected return time. In this manner, the time spend in the parking area with the battery 60 over the degradation threshold SoC is curtailed. Accordingly, the system 50 can slow the degradation of the battery life for the battery 60 as compared to a situation where the battery 60 remains above the degradation threshold SoC during the entire time (or most of the time) that the EV 52 is parked at the parking spot 56.

Furthermore, during the maintenance stage, the battery 60 of the EV 52 can be employed as an energy storage source for the power grid 58. In this manner, the revenue (credits) can be applied to the account 82 to offset the cost of parking in the parking area and/or provide non-monetary rewards to the operator of the EV 52. Furthermore, for some types of batteries, the charging and discharging (while remaining below the degradation threshold SoC of the battery 60) can further curtail the degradation of the battery 60 of the EV 52.

Figure 2:
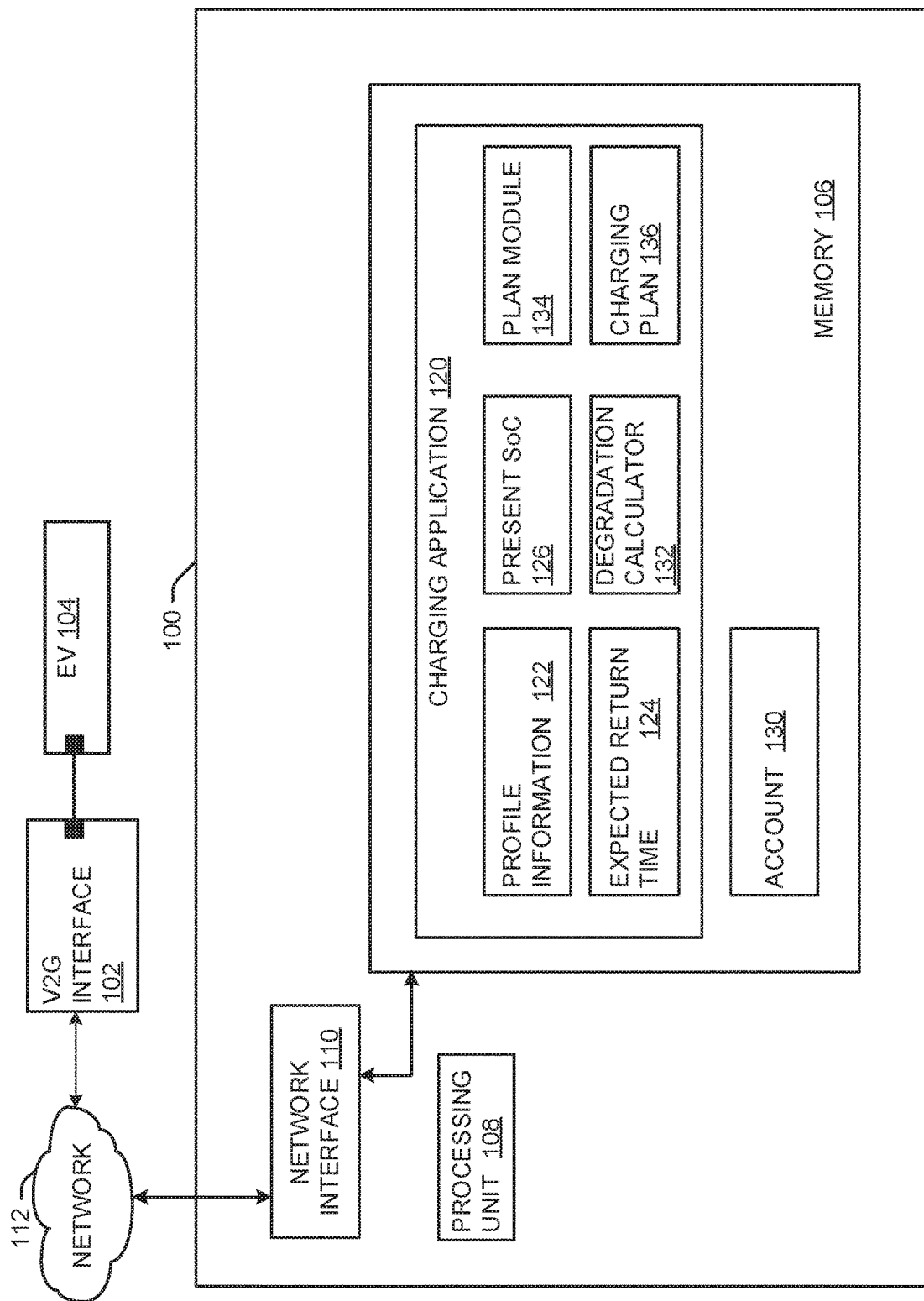
FIG. 2 illustrates an example of a charging server in communication with a vehicle-to-grid (V2G) interface to curtail battery degradation of a battery of an EV.

FIG. 2 illustrates an example of a charging server 100 that can control a V2G interface 102 to charge and discharge an EV 104. The charging server 100 could be employed, for example, to implement the charging server 66 of FIG. 1. The charging server 100 can be implemented as a computing platform. Thus, the charging server 100 includes a memory 106 and a processing unit 108. The memory 106 can be implemented, for example, as a non-transitory machine readable medium. In some examples, the memory 106 can include volatile memory (e.g., random access memory) and/or nonvolatile memory, such as flash memory, a solid state drive a hard disk drive or a combination thereof. The memory 106 can store machine executable instructions and data. The processing unit 108 can be configured to access the memory 106 and execute the machine executable instructions. The processing unit 108 can include one or more processor cores.

The charging server 100 can include a network interface 110 configured to communicate with a network 112. The network interface 110 could be implemented, for example, as a network interface card. The network 112 could be implemented for example, as a public network (e.g., the Internet), a private network (e.g., a carrier network) or a combination thereof.

The charging server 100 could be implemented, for example in a computing cloud. In such a situation, features of the charging server 100, such as the processing unit 108, the network interface 110 and the memory 106 could be representative of a single instance of hardware or multiple instances of hardware with applications executing across the multiple of instances (i.e., distributed) of hardware (e.g., computers, routers, memory, processors, or a combination thereof). Alternatively, the charging server 100 could be implemented on a single dedicated server. Additionally, in some examples, the charging server 100 and the V2G interface 102 can be operated as a single physical unit. That is, the charging server 100 can be integrated with the V2G interface 102. In other examples, the charging server 100 can communicate with the V2G interface 102 via the network 112.

The memory 106 can include a charge control application 120 that can control operations of the V2G interface 102. Moreover, in some examples, the charge control application 120 provides responses to request and/or notifications from the V2G interface 102. Additionally, an operator of the EV 104 can employ an end-user device to communicate with the V2G interface 102 and/or the charging server 100. The end-user device can be implemented as a computing device, such as a smart phone, a tablet computer or an on-board computing device integrated with the EV 104.

The charge control application 120 can receive a notification from the V2G interface 102 that the EV 104 has been connected to the V2G interface 102. In response, the charge control application 120 can cause the V2G interface 102 to query the end-user device for profile information 122 and an expected return time 124. The profile information 122 and expected return time 124 (or information corresponding to the expected return time 124) can be provided to the charge control application 120.

The profile information 122 can include, a make and model of the EV 104, as well as information characterizing features of the battery of the EV 104. Such information regarding the battery could be, for example a type (e.g., lithium-ion, nickel metal hydride, nickel-cadmium, lead-acid, etc.) of the battery and/or a capacity (e.g., kilowatt hours (kWh) or ampere hours (Ahr)) of the battery. Furthermore, in some examples, the profile information 122 can include a home address of the operator.

In some examples, the profile information 122 can include preferences of the operator of the EV 104. As an example, the profile information 122 can include an upper threshold SoC (maximum SoC of the battery of the EV 104), and a lower threshold SoC (minimum SoC of the battery of the EV 104). Additionally or alternatively, the profile information 122 can include permission (or refusal of permission) to supply power stored in the battery of the EV to the power grid.

In some examples, the V2G interface 102 can be located at a parking spot within a long-term parking area. In such a situation, in some examples, expected return time 124 can be a time and date that the operator is expecting to return to the EV 104. Alternatively, the charge control application 120 can receive information corresponding to the expected return time 124, such as a flight code, a train code, a bus code, etc.

The charge control application 120 can analyze the profile information 122 and expected return time 124 or the information corresponding to the expected return time. In examples where the charge control application 120 receive information corresponding to the expected return time (e.g., a flight code), the charge control application 120 can query a third party server (e.g., a search engine or database) for detailed information that is employable to derive the expected return time 124. The third party server could be, for example, a search engine, a database, etc. For example, in the situations where the information corresponding to the expected return time is a flight code, the charge control application 120 can query the third party server for an expected landing time of a flight corresponding to the flight code. In some examples, the charge control application 120 can set the expected return time 124 to the landing time of the flight. In other examples, the charge control application 120 can set the expected return time 124 to the landing time of the flight plus time for baggage claim and travel (e.g., thirty (30) minutes after the expected landing time of the flight).

Additionally, the charge control application 120 can query the third party server (or a different server) for information related to the EV 104. Such information can include, for example, information that may be omitted from the profile information 122, including a type and/or capacity of the battery of the EV 104. Additionally, the V2G interface 102 and/or the EV 104 can measure an SoC of the battery. The SoC denotes a percentage of a maximum charge of the battery. The measured SoC can be provided to the charge control application 120, where the charge control application 120 can store the measured SoC as a present (real-time) SoC 126 of the battery of the EV 104.

The memory 106 can include an account 130 associated with the operator of the EV 104. The account 130 can accrue tariffs (debits) and credits. Although the account 130 is illustrated as being integrated with the charging server 100, in other examples, the account 130 can be stored on an external system. For instance the account 130 could be implemented as a record of a database.

The charge control application 68 can include a degradation calculator 132. The degradation calculator 132 can be configured/programmed to employ the profile information 122 (collected or determined) to determine a degradation threshold SoC for the battery 60 of the EV 52. The degradation threshold SoC is an SoC at which the battery of the EV 104 accelerates a reduction of battery life. That is, keeping the battery of the EV at an SoC that is equal to or above the degradation threshold SoC reduces the battery life of the battery faster than if the battery of the EV 104 is below the degradation threshold SoC. The degradation threshold can be based on the physical properties of the battery of the EV 104, including battery chemistry.

The charge control application 120 can include a plan module 134 that calculates and executes a charging plan 136 for the EV 104. The charging plan 136 characterizes time intervals to discharge the battery of the EV 104 and time intervals to charge the battery of the EV 104. In some examples, the charging plan 136 can include stages, such as an initial stage, a maintenance stage and a return stage. Moreover, it is noted that the plan module 134 can update/modify the charging plan 136 periodically and/or asynchronously prior to termination of the connection between the V2G interface 102 and the EV 104.

During the initial stage of the charging plan 136, the plan module 134 commands the V2G interface 102 to discharge the battery of the EV 104 to a lower threshold SoC. The discharged power is supplied to the power grid. The lower threshold SoC is an SoC that is set to a level below the degradation threshold SoC. As one example, the lower threshold SoC can be 3% or less. In other examples, the lower threshold SoC can be set to a level sufficient to drive the EV 104 back to the home address of the operator (e.g., 10-40%). In yet other example, other levels below the degradation threshold SoC can be selected as the lower threshold SoC.

Moreover, during the initial stage, the V2G interface 102 measures an amount of power discharged from the battery of the EV 104 that is supplied to the power grid and provides data characterizing the supplied power to the charge control application 120. In response, the plan module 134 can query a utility server via the network 112 for a present (e.g., near real-time) credit value (e.g., per kilowatt hour) for power supplied to the power grid. The plan module 134 can employ the present credit value and the power supplied to the power grid to determine a credit that can be applied to the account 130 of the operator. In some examples, the credit applied can, offset a tariff (debit) for parking in the parking spot of the parking area. For instance, the credits awarded can be monetary rewards, such as cryptocurrency or credits of federally issued currency. Additionally or alternatively, the credits can be implemented as non-monetary rewards, such as but not limited to loyalty points (e.g., in a rewards program), discount coupons, complementary services for the operator of the EV 104, etc.

Upon the battery of the EV 104 being discharged to the lower threshold SoC, in some examples, the charging plan 136 switches to the maintenance stage. In the maintenance stage, the plan module 134 can periodically and/or asynchronously command the V2G interface 102 to (re)charged and (re)discharged the battery of the EV 104 between the lower threshold SoC and a maintenance threshold SoC that is less than the degradation threshold SoC. To determine the intervals for charging and discharging in the maintenance stage, the charge control application 68 can periodically or asynchronously query the utility server 86 for a cost of power from the power grid 58 and for the credit value for power provided to the power grid 58. Further, due to settings in the profile data and/or a lack of power demands at the power grid (e.g., off-peak time) in some examples, the charge plan 136 may maintain a relatively constant SoC for the battery of the EV 104 during the maintenance stage.

As noted, during the maintenance stage, the plan module 134 can adjust the charging plan 136 such that the battery of EV 104 is charged at times when the cost for power from the power grid is near a lowest price (e.g., during off-peak times). Similarly, the plan module 134 can adjust the charging plan 136 such that the EV 104 is discharged at times when the credit for supplying power to the power grid is near a maximum (e.g., during peak times). That is, the plan module 134 can set the charging plan to a pattern that attempts to elevate revenue (credit) for supplying power to the power grid from the battery of the EV 104 and curtail costs for charging the battery of the EV 104. Moreover, in some examples, the plan module 134 can apply the tariffs (debits) for charging the EV 104 during the maintenance stage to the account 130 of the operator. Additionally or alternatively, the credits for supplying power to the power grid during the maintenance stage can be applied to the account 130 of the operator of the EV 104. Further, the plan module 134 can limit the number of cycles of the battery of the EV 104 during a given time period. As one example, the plan module 134 can limit the charging plan 136 to two (2) cycles in a twenty-four (24) hour period. Furthermore, during the maintenance stage, the V2G interface 102 can re-measure the SoC of the battery of the EV 104 periodically and/or asynchronously and send data characterizing that measurement to the charge control application 120, such that the charge control application can update the present SoC 126.

Further, the charging plan 136 can switch to the return stage at a return threshold time. The return threshold time can be a calculated amount of time prior to the expected return time 124. To calculate the return threshold time, the plan module 134 calculates an amount of time needed to charge the battery of the EV 104 from the present SoC 126 to an upper threshold SoC. The upper threshold SoC can be an SoC of near 100% or a level specified in the profile information (e.g., 95%). The upper threshold SoC can be above the battery degradation threshold SoC. The plan module 134 can subtract the time needed to charge the battery of the EV 104 from the expected return time 124 to determine the return threshold time.

Upon the charging plan 136 switching to the return stage at the return threshold time, the plan module 134 commands the V2G interface 102 to charge the EV 104 to the upper threshold SoC, which is greater than the degradation threshold SoC. In this manner, at or near the expected return time 124 for the operator of the EV 104, the SoC of the battery of the EV 104 is at an SoC near the upper charge threshold SoC. Moreover, near the return threshold time, the plan module 134 can query the utility server for the present cost of power from the power grid. The cost can be applied to the account 130 of the operator of the EV 104.

Figure 3:
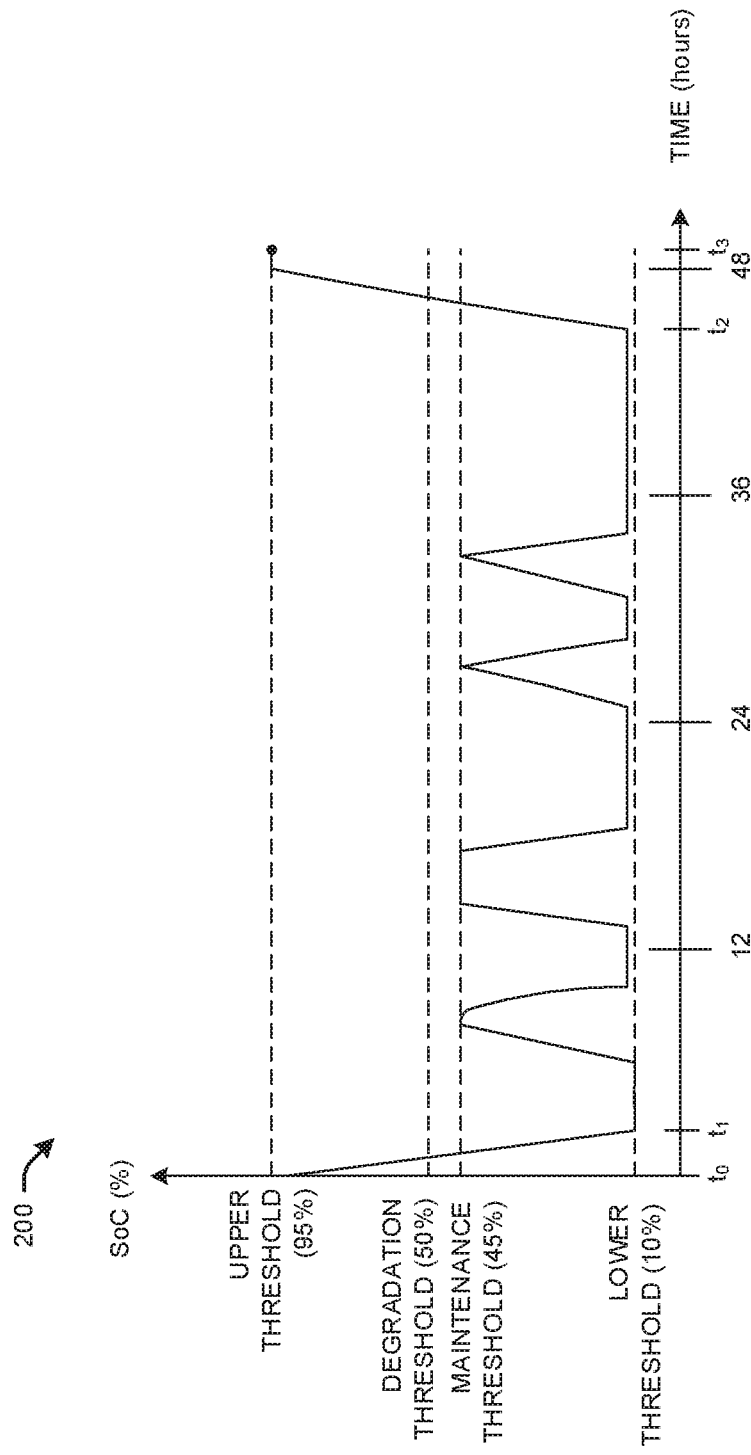
FIG. 3 illustrates an example of a graph of a charging plan that plots a state of charge (SoC) of a battery of an EV as a function of time.
Figure 4:
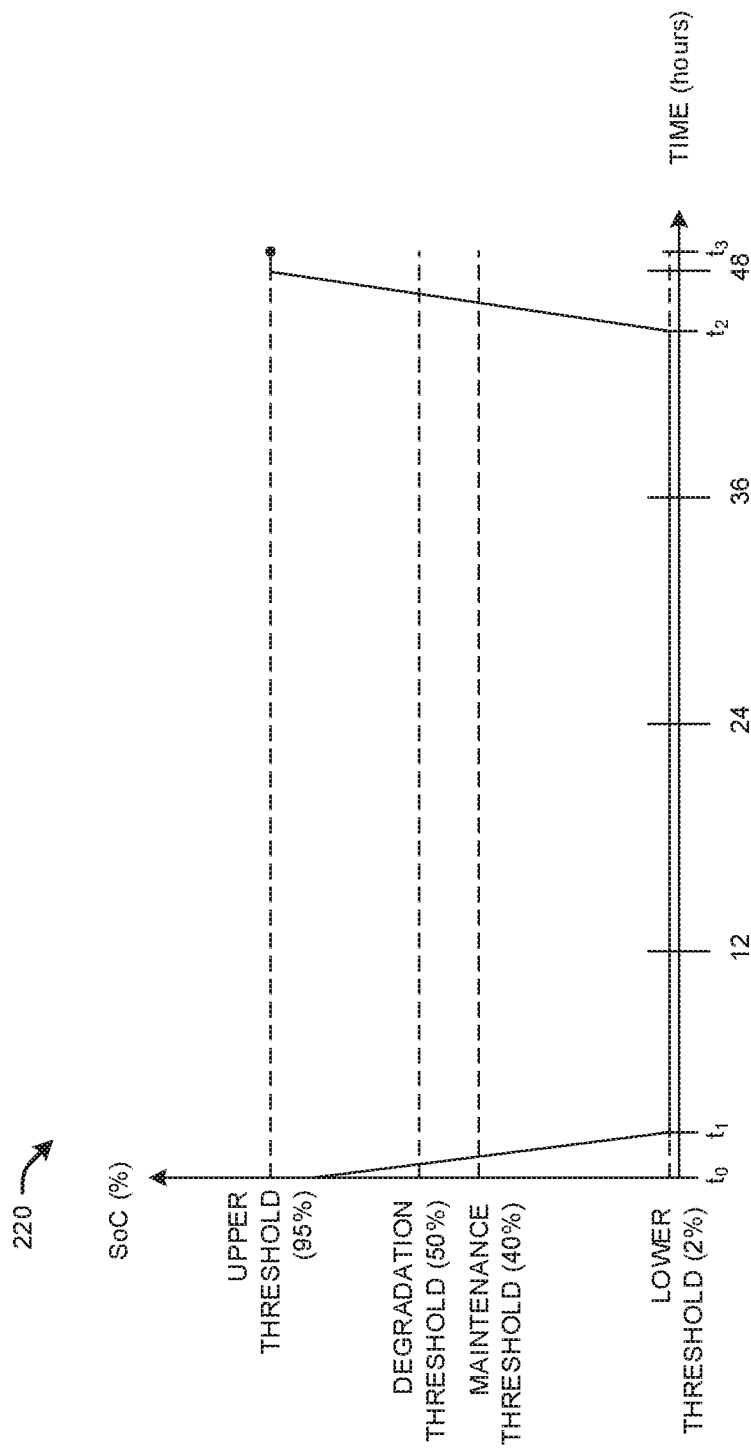
FIG. 4 illustrates another example of a graph of a charging plan that plots a SoC of a battery of an EV as a function of time.
Figure 5:
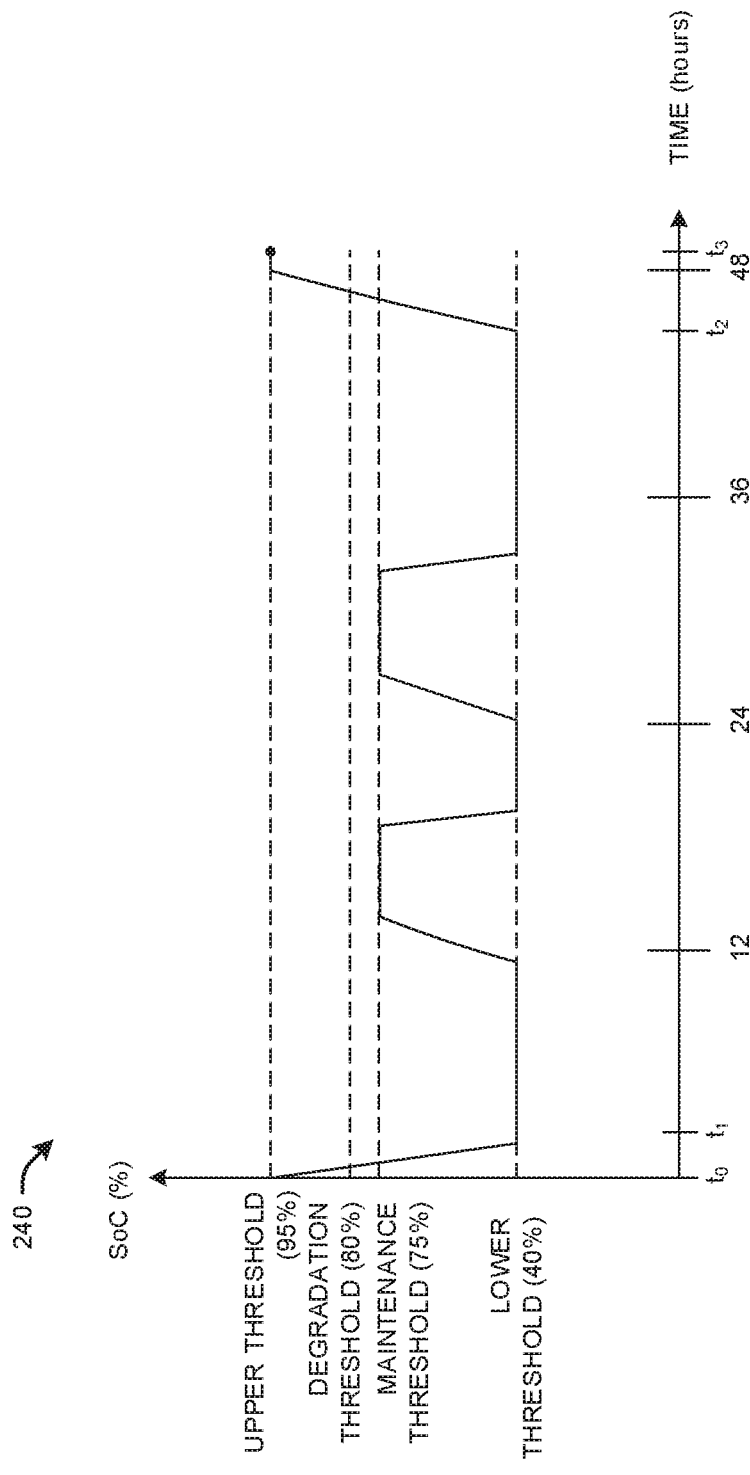
FIG. 5 illustrates yet another example of a graph of a charging plan that plots a SoC of a battery of an EV as a function of time.

FIG. 3-5 depict examples of graphs 200, 220 and 240 that plot three different charging plans (e.g., the charging plan 136). In each of the graphs 200, 220 and 240, the SoC of a battery of an EV (e.g., the EV 104 of FIG. 2) is plotted as a function of time (in hours). It is presumed that that the EV arrives and couples to the V2G interface (e.g., the V2G interface 102 of FIG. 2) at time $t_0$. At time $t_1$, it is presumed that the battery of the EV has been discharged to the lower threshold SoC. Thus, from time $t_0$ to time $t_1$, the charging plant operates in the initial stage.

Additionally, it is presumed that the expected return time is 49 hours later, marked as time $t_3$. Further, it is presumed that the return threshold time is time $t_2$. Thus, in the graphs 200, 220 and 240, it is presumed that from times $t_1$ to time $t_2$ that the charging plans operates in the maintenance stage. Still further, it is presumed that at time $t_3$, the charging plans illustrated in the graphs 200, 220 and 240 reach the return threshold time. Moreover, the expected return time is marked as time $t_3$. Thus, from times $t_2$ to $t_3$, the charging plans operate in the return stage.

Referring specifically to the charging plan depicted by the graph 200 of FIG. 3, the degradation threshold SoC is 50% of the SoC of the battery of the EV and the maintenance threshold SoC is 45% of the SoC of the battery of the EV. Moreover, the upper threshold SoC is set (e.g., by profile data) to 95% of the SoC of the battery and the lower threshold SoC is set (e.g., by the profile data) to 10% of the SoC of the battery. Thus, during the initial stage (from times $t_0$ to $t_1$), the battery is discharged from an initial SoC of about 93% to the lower threshold SoC. Moreover, over a time period between $t_1$ and $t_2$ (during the maintenance stage), the battery is cycled multiple times (charged and discharged between the maintenance threshold SoC and the lower threshold SoC) to supply power to the power grid. Moreover, to prevent excessive cycling of the battery, as illustrated, the battery is not cycled more than twice in a twenty-four (24) hour period. Further, at time $t_3$ (the return threshold time), in the return stage, the battery is charged to an SoC excessing the degradation threshold SoC to ensure the battery is charged to a level near the upper threshold SoC prior to the expected return time ($t_3$).

The charging plan illustrated by the graph 200 of FIG. 3 can be selected, for example, in situations where the degradation threshold SoC is relatively low (e.g., 50% or less of the SoC), and that the battery allows two (2) charges and discharges per twenty-four (24) hour period without accelerating battery degradation.

Referring specifically to the charging plan depicted by the graph 220 of FIG. 4, the degradation threshold SoC is 50% of the SoC of the battery of the EV and the maintenance threshold SoC is 40% of the SoC of the battery of the EV. Moreover, the upper threshold SoC is set (e.g., by profile data) to 95% of the SoC of the battery and the lower threshold SoC is set (e.g., by the profile data) to 2% (e.g., less than 3%) of the SoC of the battery. Thus, during the initial stage (from times $t_0$ to $t_1$), the battery is discharged from an initial SoC of about 93% to the lower threshold SoC. Moreover, over a time period between $t_1$ and $t_2$ (during the maintenance stage), the battery SoC remains constant (or nearly constant). In particular, the battery is not charged and discharged during the maintenance to supply power to the power grid. The charging plan illustrated by the graph 220 could be selected, for example in a situation where the profile data did not provide permission to supply power to the power grid and/or a situation where the time between $t_1$ and $t_2$ is off-peak time (e.g., during weekend). Further, at time $t_3$ (the return threshold time), in the return stage, the battery is charged to an SoC exceeding the degradation threshold SoC to ensure the battery is charged to a level near the upper threshold SoC prior to the expected return time ($t_3$).

Referring specifically to the charging plan depicted by the graph 240 of FIG. 5, the degradation threshold SoC is 80% of the SoC of the battery of the EV and the maintenance threshold SoC is 75% of the SoC of the battery of the EV. Moreover, the upper threshold SoC is set (e.g., by profile data) to 95% of the SoC of the battery and the lower threshold SoC is set (e.g., by the profile data) to 40% of the SoC of the battery. Thus, during the initial stage (from times $t_0$ to $t_1$), the battery is discharged from an initial SoC of about 93% to the lower threshold SoC. Moreover, over a time period between $t_1$ and $t_2$ (during the maintenance stage), the battery is cycled multiple times (charged and discharged between the maintenance threshold SoC and the lower threshold SoC) to supply power to the power grid). Moreover, to prevent excessive cycling of the battery, as illustrated, the battery is not cycled more than once in a twenty-four (24) hour period. Further, at time $t_3$ (the return threshold time), in the return stage, the battery is charged to an SoC excessing the degradation threshold SoC to ensure the battery is charged to a level near the upper threshold SoC prior to the expected return time ($t_3$).

The charging plan depicted by the graph 240 in FIG. 5 may be selected, for example a situation where the battery of the EV has a relatively high degradation threshold SoC (80%), but a reduced number of cycles in the life of the battery. Thus, rather than charging and discharging the battery multiple times in a day, the battery is charged and discharged (in the maintenance stage) once per day.

FIG. 3-5 collectively depict the diversity of possible charging plans even in situations where the initial arrival time ($t_0$) and the expected return time ($t_3$) remain the same. Moreover, as battery technology continues to evolve, other charging plans can be employed to reduce battery degradation.

Referring back to FIG. 2, upon the operator returning to EV 104 and disconnecting the EV 104 from the V2G interface 102, the battery of the EV 104 is at or near the upper threshold SoC. In this manner, the operator can employ the EV 104 to leave the parking spot, exit the parking area and travel to another destination (e.g., home). In some examples, upon exiting the parking area, the account 130 associated with the operator can be settled.

By employment of the charging server 100 operating in concert with the V2G interface 102, undue degradation of the battery of the EV 104 is avoided. In particular, as noted, during the initial mode, the battery is discharged to the lower threshold SoC, which is below the degradation threshold SoC. Moreover, the battery of the EV 104 is not charged to an SoC above the degradation threshold SoC until near the expected return time. In this manner, the time spent in the parking area with the battery over the degradation threshold SoC is limited. Accordingly, the charging serve 100 operating in concert with the V2G interface 102 can curtail the degradation of the battery life for the battery of the EV 104 as compared to a situation where the battery remains above the degradation threshold SoC during the entire time (or most of the time) that the EV 104 is parked at the parking spot.

Furthermore, during the maintenance stage, the battery of the EV 104 can be employed as an energy storage source for the power grid. In this manner, the credits accrued can be applied to the account 130 to offset the cost of parking in the parking area and/or provide non-monetary rewards to the operator of the EV 104. Furthermore, for some types of batteries, the charging and discharging (while remaining below the degradation threshold SoC of the battery) can further curtail the degradation of the battery of the EV 104.

Figure 6:
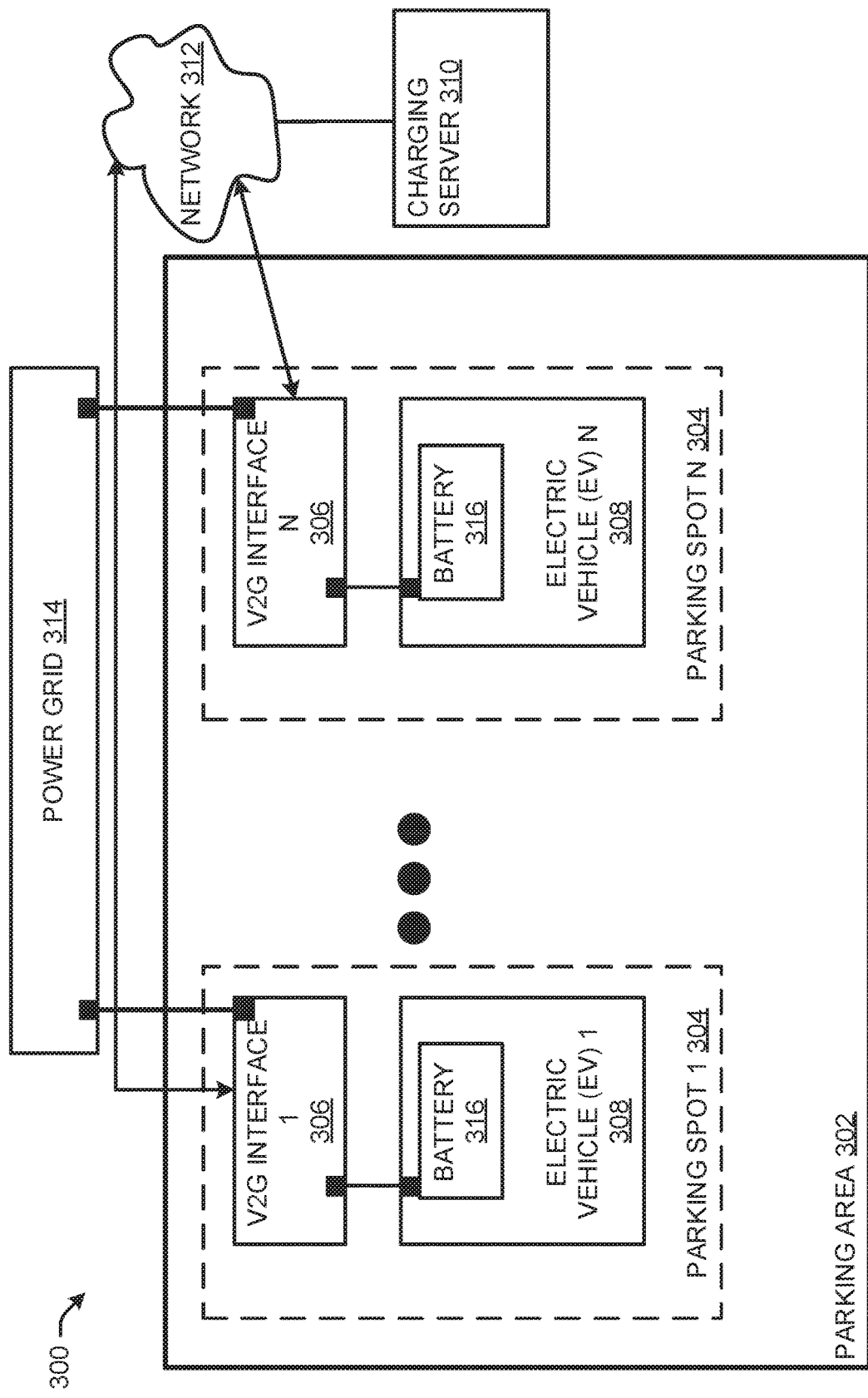
FIG. 6 illustrates another example of a system for curtailing battery degradation of a battery of an EV.

FIG. 6 illustrates an example of a system 300 that includes a parking area 302 for parking N of parking spots 304, where N is an integer greater than or equal to one (1). The parking area 302 can be a long-term parking area, such as a parking lot or a parking garage. Each parking spot 304 includes a V2G interface 306. Moreover, the parking area 302 may contain parking spots that are not associated with or in proximity with a V2G interface 306 (e.g., parking spots for non-electric vehicles).

An EV 308 can be parked at each parking spot 304 and each EV 308 can be coupled to the corresponding V2G interface 306. Moreover, each V2G interface 306 can communicate with a charging server 310 via a network 312. Additionally, each V2G interface 306 can be electrically coupled to a power grid 314. Each V2G interface 306 can employ power from the power grid 314 to charge a battery 316 of a corresponding EV 308. Additionally, each V2G interface 306 can operate as a V2G interface that supplies power to the power grid 314 through discharge of power from the battery 316 of the corresponding EV 308.

The charging server 310 can collect and/or determine profile data and a return time for each of the N number of EVs 308 in a manner described herein. Moreover, the charging server 310 can generate and execute a charging plan for each of the N number of EVs 308 in the manner described herein. Each charging plan can be tailored based on properties of the battery 316 for each of the EVs 308. In this manner, each charging plan can be selected to curtail battery degradation during long-term parking.

Figure 7:
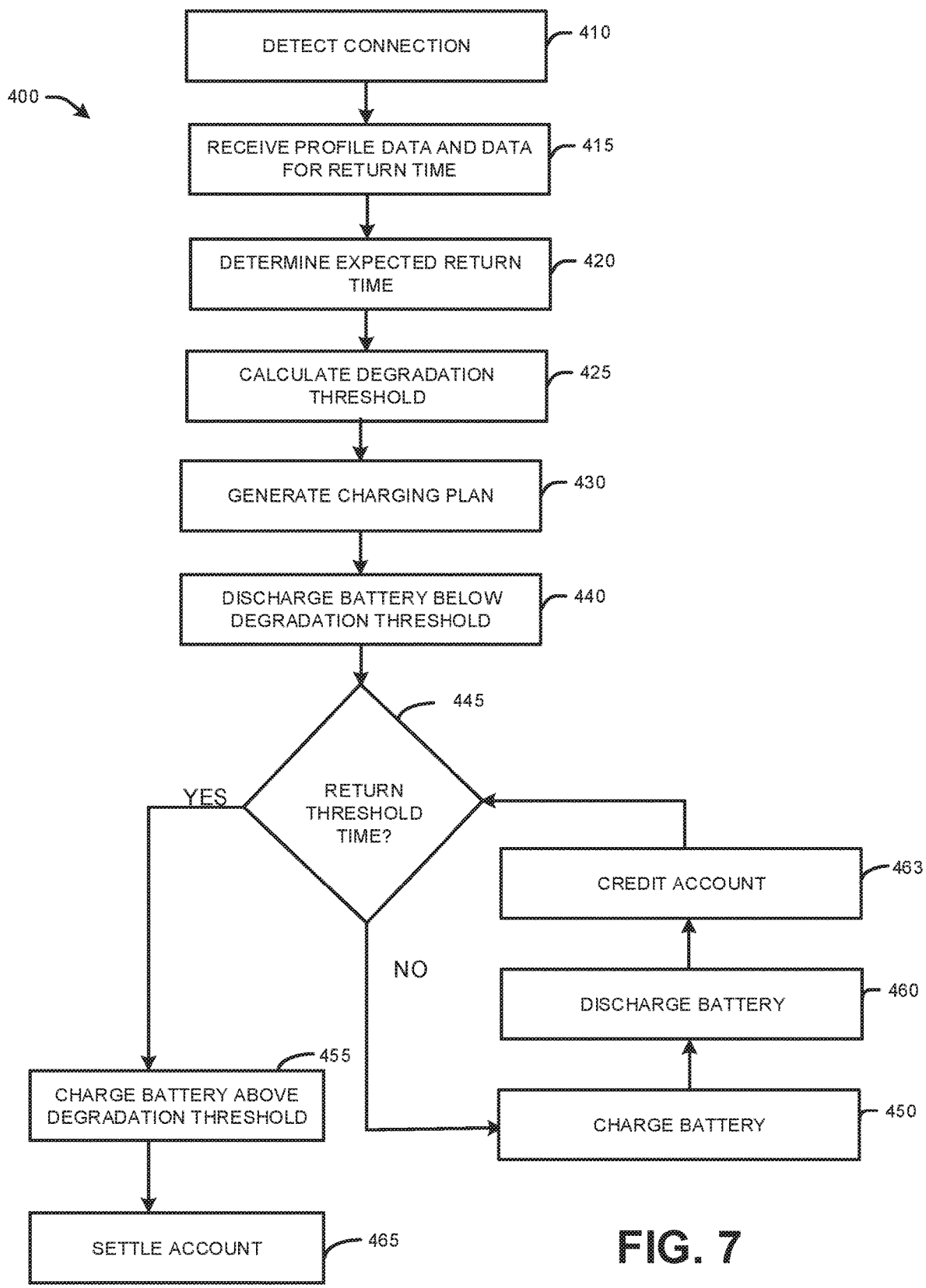
FIG. 7 illustrates a flowchart of an example of a method for curtailing battery degradation of a battery of an EV.

In view of the foregoing structural and functional features described above, example methods will be better appreciated with reference to FIG. 7. While, for purposes of simplicity of explanation, the example methods of FIG. 7 is shown and described as executing serially, it is to be understood and appreciated that the present examples are not limited by the illustrated order, as some actions could in other examples occur in different orders, multiple times and/or concurrently from that shown and described herein. Moreover, it is not necessary that all described actions be performed to implement a method. The example methods of FIG. 7 can be implemented as instructions stored in a non-transitory machine-readable medium. The instructions can be accessed by a processing resource (e.g., one or more processor cores) and executed to perform the methods disclosed herein.

FIG. 7 illustrates an example flowchart of a method 400 for reducing battery degradation of an EV parked in long-term parking. The method 400 can be implemented, for example, by the system 50 of FIG. 1 and/or the charging server 100 of FIG. 2.

At 410, a V2G interface (e.g., the V2G interface 54 of FIG. 1) can detect that an EV (e.g., the EV 52) has been electrically coupled to a receptacle of the V2G interface. At 415, a charging server (e.g., the charging server 66) can receive profile data and information corresponding to an expected return time for an operator of the EV. At 420, the charging server can determine the expected return time based on the information corresponding to the return time. For example, in situations where the information corresponding to the expected return time is a flight code, the charging server can query a third-party server for an expected arrival time of a flight corresponding to the flight code.

At 425, the charging server can calculate a degradation threshold SoC for a battery of the EV. At 430, the charging server can generate a charging plan for the EV based on the profile data and the expected return time. The charging plan includes a return threshold time. At 440, the V2G interface (in response to a command from the charging server) discharges the battery of the EV to a lower threshold SoC (a level below the degradation threshold SoC) during an initial stage of the charging plan. The discharged power is supplied to a power grid.

At 445, the charging server makes a determination as to whether the return threshold time has been reached. If the determination at 445 is negative (e.g., NO), the method 400 proceeds to 450. If the determination at 445 is positive (e.g., YES), the method 400 proceeds to 455. At 450, the V2G interface (in response to a command from the charging server), charges the battery of the EV to a maintenance threshold level SoC, a level below the degradation threshold SoC, in a maintenance stage of the charging plan. At 460, the V2G interface (in response to a command from the charging server) discharges the battery of the EV to the lower threshold SoC in the maintenance stage of the charging plan. The discharged power can be supplied to the power grid. At 463, an account associated with the operator can be credited for the power supplied to the power grid from the discharging at 460. The credits awarded to the account can be monetary rewards, such as cryptocurrency or credits of federally issued currency. Additionally or alternatively, the credit can be implemented as non-monetary related rewards, such as but not limited to loyalty points (e.g., in a rewards program), discount coupons, complementary services for the operator of the EV, etc. The method 400 returns to 445. In this manner, in the loop of 450, 460, 463 and 445 are executed repeatedly until the return charge time is reached.

At 455 (resulting from a positive determination at 445), the V2G interface (in response to a command from the charging server) initiates charging of the battery of the EV to a level above the degradation threshold SoC. At 465, the account associated with the operator is settled based in-part on the charging and discharging at 450 and 460 (e.g., upon the EV exiting the parking area).

In view of the foregoing structural and functional description, those skilled in the art will appreciate that portions of the systems and method disclosed herein may be embodied as a method, data processing system, or computer program product such as a non-transitory computer readable medium. Accordingly, these portions of the approach disclosed herein may take the form of an entirely hardware embodiment, an entirely software embodiment (e.g., in a non-transitory machine readable medium), or an embodiment combining software and hardware. Furthermore, portions of the systems and method disclosed herein may be a computer program product on a computer-usable storage medium having computer readable program code on the medium. Any suitable computer-readable medium may be utilized including, but not limited to, static and dynamic storage devices, hard disks, optical storage devices, and magnetic storage devices.

Certain embodiments have also been described herein with reference to block illustrations of methods, systems, and computer program products. It will be understood that blocks of the illustrations, and combinations of blocks in the illustrations, can be implemented by computer-executable instructions. These computer-executable instructions may be provided to one or more processors of a general purpose computer, special purpose computer, or other programmable data processing apparatus (or a combination of devices and circuits) to produce a machine, such that the instructions, which execute via the one or more processors, implement the functions specified in the block or blocks.

These computer-executable instructions may also be stored in computer-readable memory that can direct a computer or other programmable data processing apparatus to function in a particular manner, such that the instructions stored in the computer-readable memory result in an article of manufacture including instructions which implement the function specified in the flowchart block or blocks. The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions specified in the flowchart block or blocks.

Implementations of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described is this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

What have been described above are examples. It is, of course, not possible to describe every conceivable combination of structures, components, or methods, but one of ordinary skill in the art will recognize that many further combinations and permutations are possible. Accordingly, the invention is intended to embrace all such alterations, modifications, and variations that fall within the scope of this application, including the appended claims. Where the disclosure or claims recite "a," "an," "a first," or "another" element, or the equivalent thereof, it should be interpreted to include one or more than one such element, neither requiring nor excluding two or more such elements. As used herein, the term "includes" means includes but not limited to, and the term "including" means including but not limited to. The term "based on" means based at least in part on.

What is claimed is:

1. A non-transitory machine readable medium having machine executable instructions comprising a charge control application that:
    determines, in response to detecting that an electric vehicle (EV) is electrically coupled to a vehicle-to-grid (V2G) interface, a degradation threshold state of charge (SoC) for a battery of the EV;
    commands the V2G interface to discharge the battery of the EV to a lower threshold SoC that is below the degradation threshold SoC;
    commands the V2G interface to charge the battery of the EV to an upper threshold SoC that is above the degradation threshold SoC at a return threshold time that defines an amount of time needed to charge the battery of the EV to a SoC near a maximum SoC of the battery of the EV, wherein the return threshold time is a calculated amount of time prior to an expected return time of an operator of the EV that is based on data comprising a flight code received from an end-user device; and
    queries a server for an expected return time of a flight identified by the flight code, wherein the expected return time of the operator of the EV is based on the expected return time of the flight identified by the flight code.

2. The medium of claim 1, wherein the end-user device is a smart phone.

3. The medium of claim 1, wherein the end-user device is an on-board computer of the EV.

4. The medium of claim 1, wherein the V2G interface is located at a long-term parking area.

5. The medium of claim 1, wherein the lower threshold SoC is 3% or less.

6. A non-transitory machine readable medium having machine executable instructions comprising a charge control application that:
    determines, in response to detecting that an electric vehicle (EV) is electrically coupled to a vehicle-to-grid (V2G) interface, a degradation threshold state of charge (SoC) for a battery of the EV;
    commands the V2G interface to discharge the battery of the EV to a lower threshold SoC that is below the degradation threshold SoC;
    commands the V2G interface to charge the battery of the EV to an upper threshold SoC that is above the degradation threshold SoC at a return threshold time, wherein the return threshold time is a calculated amount of time prior to an expected return time of an operator of the EV;
    commands the V2G interface to charge the battery of the EV to a maintenance threshold SoC that is between the degradation threshold SoC and the lower threshold SoC;
    commands the V2G interface to re-discharge the battery of the EV before the return threshold time; and
    credits an account associated with the operator of the EV for the re-discharging, wherein the V2G interface supplies power discharged and re-discharged by the battery of the EV to a power grid.

7. The medium of claim 6, wherein the charge control application commands the V2G interface to charge the battery of the maintenance threshold SoC during an off-peak time for the power grid.

8. The medium of claim 7, wherein the charge control application commands the V2G interface to re-discharge the battery of the EV to the lower threshold SoC during a peak time for the power grid.

9. A system for curtailing degradation of a battery of an electric vehicle (EV) comprising:
    a vehicle-to-grid (V2G) interface located at a parking spot of a parking area, the V2G interface comprising a receptacle for charging and discharging an EV;
    a charging server in communication with the V2G interface that:
        determines, in response to a request from the V2G interface, a degradation threshold state of charge (SoC) for a battery of the EV connected to the receptacle of the V2G interface, wherein the degradation threshold SoC is based on physical properties of a battery of the EV;
        commands the V2G interface to discharge the battery of the EV to a lower threshold SoC that is below the degradation threshold SoC;
        commands the V2G interface to charge the battery of the EV to an upper threshold SoC that is above the degradation threshold SoC at an return time threshold that corresponds to a calculated amount of time prior to an expected return time of an operator of the EV; and
        provides a credit to an account of the operator of the EV in response to suppling power to a power grid coupled to the V2G interface with power discharged from the battery of the EV.

10. The system of claim 9, wherein the parking lot is a long-term parking area, and the credit is applied to a tariff for parking the EV at the parking spot.

11. The system of claim 9, wherein the charging server commands the V2G interface to cycle the battery of the EV a plurality of times prior to the return threshold time.

12. The system of claim 9, wherein the charging server receives information from an end-user device associated with the operator of the EV that identifies a flight corresponding to the expected return time of the operator of the EV.

13. The system of claim 9, wherein the upper threshold SoC is near a maximum SoC for the battery of the EV.

14. A method for curtailing degradation of a battery of an electric vehicle (EV), the method comprising:
    determining, in response to detecting that an electric vehicle (EV) is electrically coupled to a vehicle-to-grid (V2G) interface, an expected return time of an operator of the EV;
    discharging a battery of the EV to a level below a degradation threshold SoC for the battery of the EV;
    initiating a charging of the battery of the EV to a level that is above the degradation threshold SoC at a return threshold time that is a calculated amount of time prior to the expected return time of the operator of the EV;
    repeatedly charging and discharging the battery of the EV prior to the return threshold time, wherein power discharged from the battery of the EV is supplied to a power grid coupled to the V2G interface; and crediting an account associated with the operator of the EV for the power supplied to the power grid from the battery of the EV.

15. The method of claim 14, wherein the V2G interface is located at a parking spot in a long-term parking area.

16. A method for curtailing degradation of a battery of an electric vehicle (EV), the method comprising:

determining, in response to detecting that an EV is electrically coupled to a vehicle-to-grid (V2G) interface, a degradation threshold state of charge (SoC) for a battery of the EV;

commanding the V2G interface to discharge the battery of the EV to a lower threshold SoC that is below the degradation threshold SoC;

commanding the V2G interface to charge the battery of the EV to an upper threshold SoC that is above the degradation threshold SoC at a return threshold time that defines an amount of time needed to charge the battery of the EV to a SoC near a maximum SoC of the battery of the EV, wherein the return threshold time is a calculated amount of time prior to an expected return time of an operator of the EV that is based on data comprising a flight code received from an end-user device; and querying a server for an expected return time of a flight identified by the flight code, wherein the expected return time of the operator of the EV is based on the expected return time of the flight identified by the flight code.

17. The method of claim 16, wherein the lower threshold SoC is 3% or less.

18. The method of claim 16, further comprising crediting an account of the operator of the EV in response to suppling power to a power grid coupled to the V2G interface with power discharged from the battery of the EV.

19. The method of claim 18, wherein the charge control application commands the V2G interface to charge the battery of the maintenance threshold SoC during an off-peak time for the power grid.

20. The method of claim 19, wherein the charge control application commands the V2G interface to re-discharge the battery of the EV to the lower threshold SoC during a peak time for the power grid.

* * * * *